United States Patent Office 2,855,441
Patented Oct. 7, 1958

2,855,441

DIYNIC ACETALS

Franz Sondheimer, Mexico City, Mexico

No Drawing. Application July 6, 1953
Serial No. 366,392

Claims priority, application Mexico July 9, 1952

2 Claims. (Cl. 260—615)

The present invention relates to the production of dienic aldehydes and alcohols. More particularly, the present invention relates to a novel process for the production of the perfume of violet leaves 2(trans),6(cis)-nonadienal as well as for the production of certain novel intermediates as well as other similar compounds and to the novel compounds produced thereby.

2(trans),6(cis)-nonadienal thus far has only been obtained by oxidation of the corresponding alcohol 2,6-nonadienol. Both of these compounds have been shown to be important components of violet leaf oil and to be chiefly responsible for its characteristic odor. Although various attempts have been made to prepare the dienal, no method has been known heretofore for the preparation of this compound in good yields.

In accordance with the present invention, a novel process has been provided for the preparation of 2(trans),6(cis)-nonadienal starting from dipropargyl, i. e., 1,5-hexadiyne.

In accordance with the present invention, there has further been discovered certain novel processes and certain novel intermediates, namely, dienic alcohols and aldehydes, acetals of dienic aldehydes, diynic alcohols and diethyl acetals of diynic aldehydes.

In general, a portion of the process of the present invention may be exemplified by the following equation:

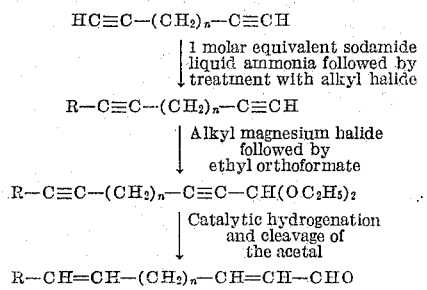

In the above equation, R represents an alkyl group resulting, for example, from the treatment of the first compound above set forth with ethyl iodide, although, if other alkyl iodides or halides are utilized, as may be understood R may represent the propyl or butyl group. In the above formula, $n$ is a whole number and preferably the number two, although the reaction may be generally applied to other compounds where $n$ is greater than two to prepare corresponding derivatives.

In practising the process above outlined a suitable terminal diacetylene such as dipropargyl (1,5-hexadiyne) prepared in accordance with the process of Raphael and Sondheimer, J. Chem. Soc., 120 (1950), is first reacted with approximately 1 mol of sodamide in liquid ammonia, although other methods may be utilized for preparing the equivalent monosodium salt. Thereafter the monosodium salt is treated with an alkyl halide as, for example, ethyl iodide. In the alternative other alkyl halides may be used and then the R of the second formula in the equation may vary correspondingly. If ethyl iodide is utilized, the resultant product is the key intermediate 1,5-octadiyne. This last compound was then converted to the Grignard complex, as by treatment with alkyl magnesium halide and the Grignard complex reacted with ethyl orthoformate to give the corresponding 2,6-nonadiynal diethyl acetal. The two triple bonds of the acetal could then either be first subjected to partial catalytic hydrogenation to double bonds, followed by cleavage of the acetal group or in the alternative the acetal group could first be cleaved and the resultant compound subjected to catalytic hydrogenation. Preferably for the hydrogenation, a palladium calcium carbonate catalyst was utilized. For the cleavage, and/or hydrolysis of the acetal, a dilute mineral acid such as sulfuric acid, together with steam distillation proved effective.

The resultant product, where R represents the ethyl group in the above equation, and $n$ is two, is the desired 2,6-nonadienal which has been shown to be identical as by mixed melting points of solid derivatives and comparison of infrared curves with the natural violet leaf perfume.

The following equation illustrates the last step of the previously referred to process wherein the acetal is first cleaved to produce the corresponding novel aldehyde having two triple bonds. This compound may thereafter be subjected to partial hydrogenation to produce the 2,6-nonadienal:

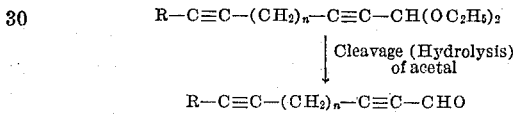

In the above equation, R and $n$ designate the same items as hereinbefore set forth.

The following equation illustrates the production of still another novel type of intermediate where the acetal is first subjected to catalytic hydrogenation, the resultant compound being an acetal having two double bonds rather than two triple bonds. As may be understood the final product may then be subjected to cleavage to also produce the corresponding 2,6-nonadienal.

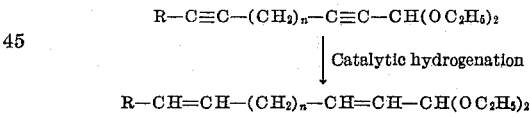

In the above equation, R represents an alkyl group and $n$ a whole number as hereinbefore set forth.

The key intermediate, i. e., 1,5-octadiyne, may also be utilized for the production of 2,6-nonadiene-1-ol in accordance with the following equation:

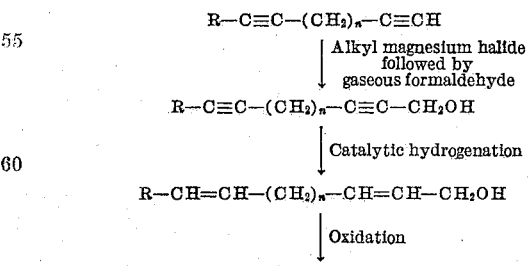

In the above equation, R represents an alkyl group and $n$ a whole number as hereinbefore set forth.

In proceeding according to the above equation, the 1,5-octadiyne, or an equivalent compound, i. e., wherein $n$ represents a whole number other than 2 and R an alkyl group other than ethyl, is reacted to form a Grignard complex with a suitable alkyl magnesium halide. This Grignard complex is then reacted with gaseous formaldehyde to produce, for example, 2,6-nonadiyne-1-ol or in the case where $n$ is other than 2 and R other than the ethyl group, a corresponding diacetylenic compound. This alcohol is then subjected to catalytic hydrogenation to form the 2(cis),2(cis)-nonadiene-1-ol. This alcohol had the powerful fresh odor associated with the naturally occurring alcohol and upon oxidation with chromium trioxide, according to methods heretofore known, gave 2(trans),6(cis)-nonadienal.

The following specific examples serve to illustrate, but are not intended to limit the present invention:

Example I

A solution of dipropargyl (24.4 g.) in anhydrous ether was added in a period of 15 minutes to a stirred suspension of sodamide in liquid ammonia prepared from 7.9 g. of sodium metal. During this time the solution was cooled in a mixture of alcohol and carbon dioxide and the stirring was continued for another 90 minutes. 58 g. of ethyl iodide in 100 cc. of ether were then added in 30 minutes and the cooled mixture was stirred for six hours more. The ammonia was evaporated on the steam bath, ether and water were added to the residue, the aqueous layer was washed with ether, and the combined ethereal extracts were washed successively with dilute sulphuric acid, sodium bicarbonate solution and water. The extract was dried over magnesium sulphate and evaporated through a short Vigreux column and the residue was distilled through the same column. Redistillation yielded 15.5 g. of pure 1,5-octadiyne, boiling point 45–47° C./21 mm.

Example II

A solution of ethyl magnesium bromide in 120 cc. of ether was prepared from 4.3 g. of magnesium and 25 g. of ethyl bromide in the usual way. 15.3 g. of 1,5-octadiyne in 60 cc. of ether was added during 5 minutes, and the stirred solution was heated under reflux in a nitrogen atmosphere for 2 hours. 45 g. of ethyl orthoformate were added in a thin stream, and heating in nitrogen was continued for a further 6 hours. The ether was distilled off and the residue was heated on the steam bath for 1 hour. Ether and saturated ammonium chloride solution were added, and the organic layer, after being washed with more ammonium chloride solution and water, was dried over magnesium sulphate and evaporated. Distillation of the residue gave 24.2 g. of 2,6-nonadiynal diethyl acetal with boiling point 104–105° C./0.3 mm.

Example III 9.0 g. of the diethyl acetal obtained in accordance to Example II was added to 100 cc. of 2 N sulphuric acid and the mixture was rapidly distilled in steam until the distillate no longer gave a precipitate with aqueous 2,4-dinitrophenylhydrazine reagent. The aqueous distillate (300 cc.) which had been kept under a nitrogen atmosphere during the distillation, was extracted with ether, the organic layer was washed with water, dried and evaporated. Distillation of the residue through a short Vigreux column yielded 4.7 g. of 2,6-nonadiynal with boiling point 58–59° C./0.3 mm., 111–112° C./18 mm.

Example IV

A solution of 10.3 g. of the acetal obtained in accordance to Example II in 50 cc. of ethyl acetate was hydrogenated in the presence of 1 g. of 3% palladium on calcium carbonate catalyst until two mols of gas had been absorbed. The catalyst was filtered off and the solvent was evaporated. Distillation of the residue gave 8.5 g. of 2(cis),6(cis)-nonadienal diethyl acetal with boiling point 67–70° C./0.2 mm.

Example V

A mixture of 4.5 g. of the diethylenic acetal obtained in accordance to Example IV and 75 cc. of 2 N sulphuric acid were steam distilled in the same way as described in Example III. 1.8 g. of 2(trans),6(cis)-nonadienal was obtained with a very powerful fresh cucumber-like odor, boiling point 94–95.5° C./18 mm. In addition, 1 g. of unchanged acetal was recovered.

Example VI

A solution of ethyl magnesium bromide in 80 cc. of ether was prepared from 1.95 g. of magnesium and 12 g. of ethyl bromide in the usual way. 6.85 g. of 1,5-octadiyne in 30 cc. of ether was added during 10 minutes and the stirred solution was heated under reflux in a nitrogen atmosphere for 2.5 hours. Excess formaldehyde was passed into the stirred reaction mixture by means of a slow current of nitrogen. The ether boiled gently, although no external heating was applied. The mixture was then heated under reflux for 30 minutes. It was poured into dilute sulphuric acid and ice, and the organic layer was washed with sodium bicarbonate solution and water. The dried extract was evaporated and the residue was distilled through a short Vigreux column to yield 6.3 g. of 2,6-nonadiyne-1-ol with boiling point 83–85° C./0.3 mm.

Example VII 1.6 g. of the alcohol obtained in accordance to Example VI in 10 cc. of ethyl acetate was shaken in hydrogen in the presence of 0.2 g. of 3% palladium-calcium carbonate catalyst until two mols of gas had been absorbed. The residue, after removal of the catalyst and solvent, was distilled to yield 1.23 g. of 2(cis),6(cis)-nonadiene-1-ol with boiling point 108–110° C./24 mm.

I claim:

1. A new diethyl acetal having the following formula:

$$R-C\equiv C-(CH_2)_n-C\equiv C-CH(OC_2H_5)_2$$

wherein R is a lower alkyl group and $n$ is a whole number.

2. The diethyl acetal of 2,6-nonadiynal.

References Cited in the file of this patent

UNITED STATES PATENTS

| Number | Name | Date |
|---|---|---|
| 2,232,867 | Reppe et al. | Feb. 25, 1941 |
| 2,343,830 | Lichty | Mar. 7, 1944 |
| 2,455,677 | Horeczy | Dec. 7, 1948 |
| 2,508,257 | Hearne et al. | May 16, 1950 |
| 2,517,006 | MacLeane | Aug. 1, 1950 |

OTHER REFERENCES

McElvain: J. Am. Chem. Soc., 64, 1966 (1942).
Ruzicka et al.: Helv. Chim. Acta, 27, 1561–9 (1944).
Henne et al.: J. Am. Chem. Soc., 67, 484–5 (1945).
Johnson: "The Chemistry of Acetylenic Compounds," vol. I, The Acetylenic Alcohols, Edward Arnold & Co. (1946); pages 90–91 relied on.
Fieser et al.: "Organic Chemistry," 2nd edition, D. C. Heath & Co. (1950); p. 217 relied on.
Beilstein, Band I, 2nd Supplement; p. 812 relied on.